United States Patent
Sanders

(10) Patent No.: US 10,480,706 B2
(45) Date of Patent: Nov. 19, 2019

(54) ADJUSTABLE ELECTRONIC DEVICE HOLDER

(71) Applicant: Cynthia Sanders, Savannah, GA (US)

(72) Inventor: Cynthia Sanders, Savannah, GA (US)

( * ) Notice: Subject to any disclaimer, the term of this patent is extended or adjusted under 35 U.S.C. 154(b) by 0 days.

(21) Appl. No.: 15/664,579

(22) Filed: Jul. 31, 2017

(65) Prior Publication Data

US 2018/0031174 A1 Feb. 1, 2018

Related U.S. Application Data

(60) Provisional application No. 62/368,517, filed on Jul. 29, 2016.

(51) Int. Cl.

| F16M 11/10 | (2006.01) |
|---|---|
| F16M 11/20 | (2006.01) |
| F16M 11/40 | (2006.01) |
| F16M 11/24 | (2006.01) |
| F16M 11/04 | (2006.01) |
| F16M 13/00 | (2006.01) |
| F16M 13/02 | (2006.01) |

(52) U.S. Cl.
CPC ........... *F16M 11/10* (2013.01); *F16M 11/041* (2013.01); *F16M 11/2021* (2013.01); *F16M 11/242* (2013.01); *F16M 11/40* (2013.01); *F16M 13/00* (2013.01); *F16M 13/022* (2013.01); *F16M 2200/027* (2013.01)

(58) Field of Classification Search
CPC .. F16M 11/40; F16M 11/242; F16M 11/2021; F16M 11/10; F16M 11/041; F16M 13/00; F16M 13/022; B60R 11/0241; F16B 2/10; F16B 2/12

USPC ........................................ 248/163.1–439, 448
See application file for complete search history.

(56) References Cited

U.S. PATENT DOCUMENTS

| 6,454,106 B1 * | 9/2002 | Howard | A47B 45/00 211/43 |
|---|---|---|---|
| D646,903 S | 10/2011 | Santana | |
| 8,312,991 B2 | 11/2012 | Diebel et al. | |
| 8,474,778 B2 * | 7/2013 | Jacobson | F16M 11/041 248/206.2 |
| 2005/0092875 A1 * | 5/2005 | Carnevali | F16M 11/40 248/160 |
| 2005/0205724 A1 * | 9/2005 | Carnevali | F16M 11/14 248/122.1 |
| 2008/0087789 A1 * | 4/2008 | Haynes | A47B 23/007 248/454 |

(Continued)

*Primary Examiner* — Christopher Garft
(74) *Attorney, Agent, or Firm* — Global Intellectual Property Agency, LLC; Daniel Boudwin

(57) ABSTRACT

An adjustable electronic device holder. The adjustable electronic device holder includes a bracket slidably connected to a center plate for receiving an electronic device. An elongated arm extends from the center plate to a base for supporting the adjustable electronic device holder in an upright position. Two opposing brackets are connected so as to allow for selective lateral movement relative to the center plate. The opposing brackets form a planar backing that is adapted to rest flush with the center plate. Each bracket includes a perpendicular edge extending from three sides of a perimeter. A flange extends from the perpendicular edge to define a channel wherein tablet computers and other electronic devices may be received and removably secured.

8 Claims, 4 Drawing Sheets

(56) References Cited

U.S. PATENT DOCUMENTS

| | | | |
|---|---|---|---|
| 2009/0218454 A1* | 9/2009 | Stanley | F16M 13/00 |
| | | | 248/121 |
| 2010/0314508 A1* | 12/2010 | Bevirt | F16M 11/041 |
| | | | 248/121 |
| 2012/0025036 A1* | 2/2012 | Huang | F16M 11/041 |
| | | | 248/122.1 |
| 2012/0091307 A1* | 4/2012 | Haynes | A47B 23/043 |
| | | | 248/451 |
| 2012/0187257 A1 | 7/2012 | Zou | |
| 2012/0207462 A1* | 8/2012 | Justice | F16M 11/041 |
| | | | 396/428 |
| 2012/0273637 A1* | 11/2012 | Huang | F16M 11/041 |
| | | | 248/291.1 |
| 2012/0312936 A1* | 12/2012 | Huang | F16M 11/041 |
| | | | 248/122.1 |
| 2013/0048802 A1 | 2/2013 | Guran | |
| 2014/0145050 A1* | 5/2014 | Hung | F16M 11/041 |
| | | | 248/274.1 |
| 2014/0265752 A1 | 9/2014 | Caine et al. | |
| 2018/0279809 A1* | 10/2018 | Regan | A47F 7/0246 |

* cited by examiner

ADJUSTABLE ELECTRONIC DEVICE HOLDER

CROSS REFERENCE TO RELATED APPLICATIONS

This application claims the benefit of U.S. Provisional Application No. 62/368,517 filed on Jul. 29, 2016. The above identified patent application is herein incorporated by reference in its entirety to provide continuity of disclosure.

BACKGROUND OF THE INVENTION

The present invention relates to electronic device holders and stands. More specifically, the present invention provides an adjustable stand for tablet computers and electronic reader devices.

While paperback and hardcover books are still common, more and more people opt to use their smartphone or specially-designed electron devices to read books and magazines. These electronic devices come in a variety of sizes and shapes. People typically must hold these devices in their hands while reading, putting the electronic device at risk for being dropped or damaged by the user.

There is also a risk that sand and other debris may enter the device if placed down at the beach or in the park, potentially causing damage. Further, stress from holding the tablet or electronic reading device in a reading position can be uncomfortable and frustrating. This can lead to pain and fatigue in a reader's arms, shoulders, and neck.

In light of the devices disclosed in the known art, it is submitted that the present invention substantially diverges in design elements from the known art and consequently it is clear that there is a need in the art for an improvement to existing electronic device stands. In this regard, the instant invention substantially fulfills these needs.

SUMMARY OF THE INVENTION

In view of the foregoing disadvantages inherent in the known types of electronic device holders and stands now present in the art, the present invention provides an adjustable stand for tablet computers and electronic reader devices wherein the same can be utilized for providing convenience for the user when reading from such devices.

It is therefore an object of the present invention to provide an adjustable electronic device holder that has all the advantages of the prior art and none of the disadvantages.

It is another object of the present invention to provide an adjustable electronic device holder comprising an elongated arm having one end hingedly attached to a rigid planar base and another end hingedly connected to a center plate, wherein two opposing brackets are in slidable communication with the center plate. The opposing brackets having a perpendicular edge extending from the perimeter thereon. A flange extends from the perpendicular edge to define a channel configured to receive and removably secure tablets and e-reader devices.

Another object of the present invention is to provide an adjustable electronic device holder wherein the elongated arm is pivotally attached to the rigid planar base and center plate.

It is another object of the present invention to provide an adjustable electronic device holder wherein the elongated arm is extendable telescopically.

It is another object of the present invention to provide an adjustable electronic device holder wherein a layer of material suitable for adding friction is disposed along the bottom surface of the rigid planar base.

Yet another object of the present invention is to provide an adjustable electronic device holder wherein a battery-operated light is operably attached to one of the opposing arms.

It is another object of the present invention to provide an adjustable electronic device holder wherein three legs pivotally connected to the first planar panel form a stand.

It is another object of the present invention to provide an adjustable electronic device holder wherein each of the legs pivotally attached to the first planar panel is independently movable.

Yet another object of the present invention is to provide an adjustable electronic device holder wherein each of the legs pivotally connected to the first planar panel and made of a flexible construction.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
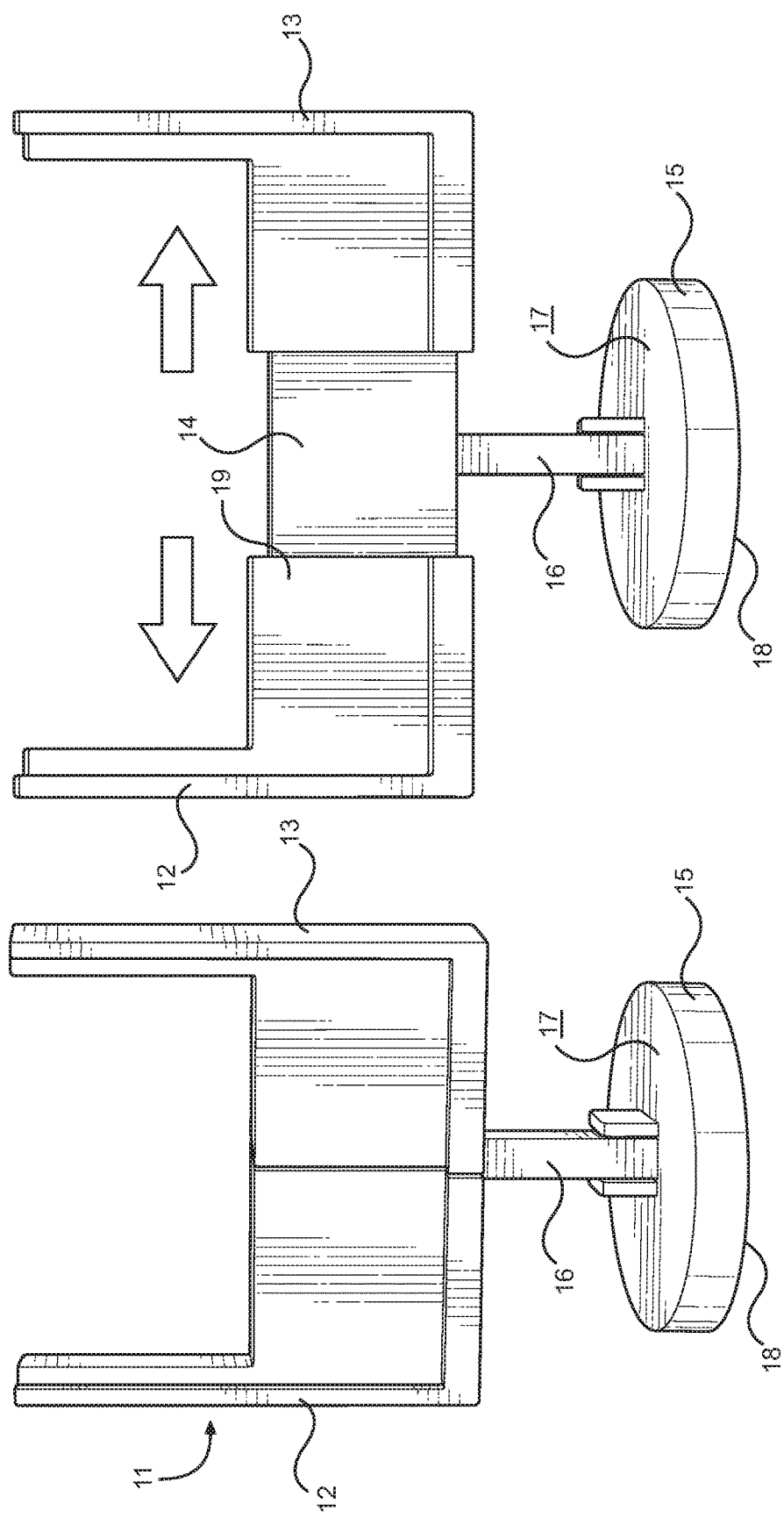
FIG. 1A shows a front view of an embodiment of the adjustable electronic device holder in a closed position.
FIG. 1B shows a front view of an embodiment of the adjustable electronic device holder in an open position.

Reference is made herein to the attached drawings. Like reference numerals are used throughout the drawings to depict like or similar elements of the adjustable electronic device holder. The figures are intended for representative purposes only and should not be considered to be limiting in any respect.

Referring now to FIGS. 1A and 1B, there is shown a front view of an embodiment of the adjustable electronic device holder in a closed position and an open position, respectively. The adjustable electronic device holder 11 comprises a first and second bracket 12, 13 in slidable engagement with a center plate 14 and connected to a base 15 via an elongated arm 16. In the shown embodiment, the first and second bracket 12, 13 include an open upper end that is adapted to receive an electronic device therein. In one embodiment, the first and second bracket 12, 13 are mirror images of each other and are configured to slide towards and away from each other so as to fit the electronic device therein.

In the shown embodiment, the base 15 comprises a rigid planar base 15 having an upper surface 17 and lower surface 18, wherein the lower surface is hingedly attached to one end of the elongated arm 16 along its upper surface 17. In one embodiment, the lower surface 18 of the base 15 utilizes a friction inducing material. The elongated arm 16 is hingedly attached to the center plate 14 on another end thereto. The first bracket 12 and second bracket 13 are attached on opposing sides of the center plate 14 and are in slidable engagement with the center plate 14. The first and second bracket 12, 13 are configured for selective lateral movement along the center plate 14 such that they can rest flush against each other or open wider by sliding away each other along the center plate 14.

Figure 2:
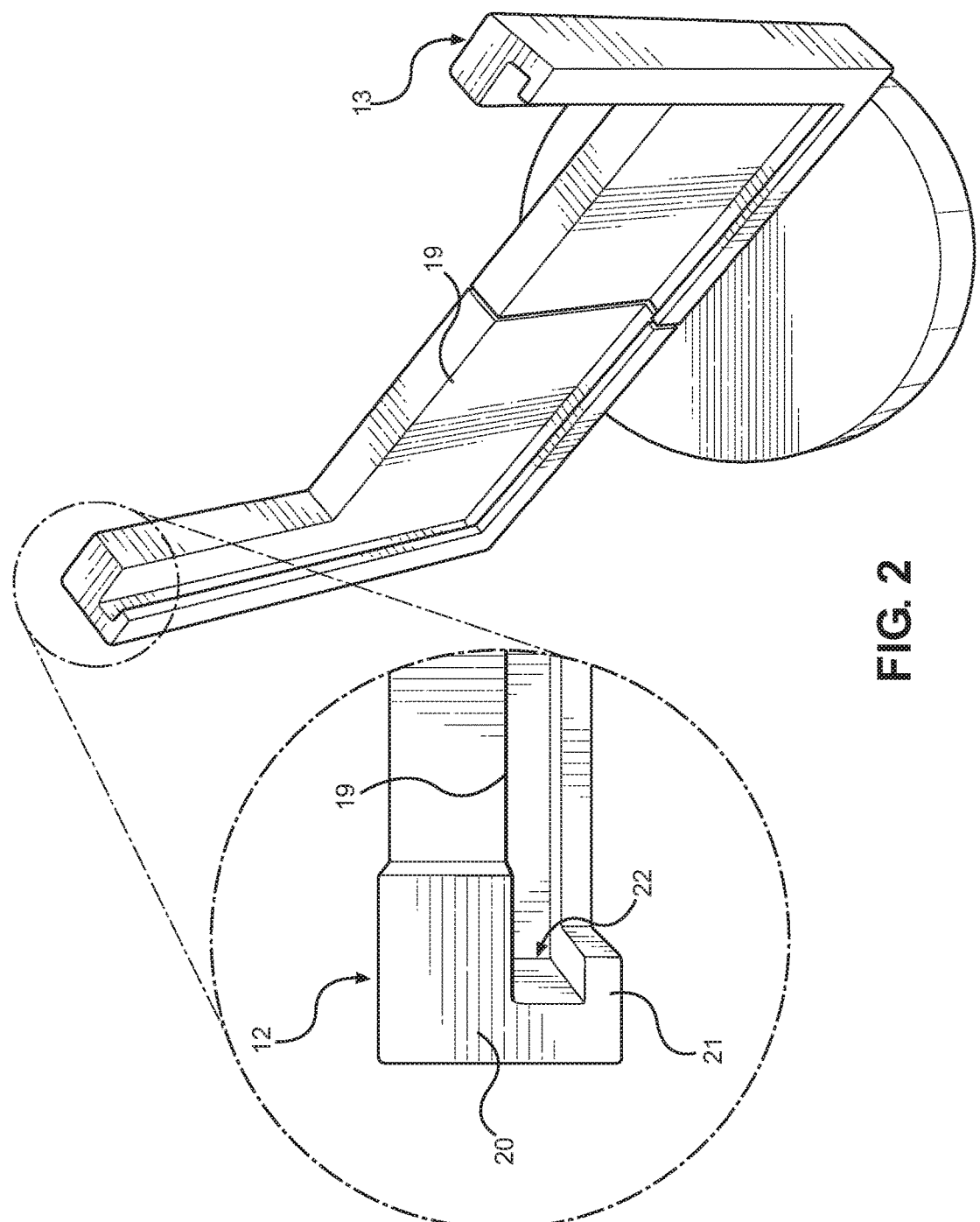
FIG. 2 shows a detailed overhead view of the channel of the adjustable electronic device holder.

Referring now to FIG. 2, there is shown detailed overhead view of the channel of the adjustable electronic device holder. In one embodiment, the first bracket 12 and second bracket 13 consist of a planar backing 19 which rests flush with the center plate 14. A perpendicular edge 20 extends out from the perimeter of the first bracket 12 and second bracket 13 and a flange 21 extends from the perpendicular edge 20 over the backing 19 to define a channel 22. The channel 22 is configured to receive and removably secure electronic devices therein. The perpendicular edge 20 and the flange 21 of each of the brackets 12, 13 form opposing L-shaped configurations such that the first bracket 12 and second bracket 13 form a backing 19 enclosed on three sides defining a channel 22. The first bracket 12 and second bracket 13 may adjust along the center plate 14 through selective lateral movement to accommodate electronic devices of varying sizes wherein the edges of the device will be held within the defined channel 22 of the first and second brackets 12, 13.

Figure 3:
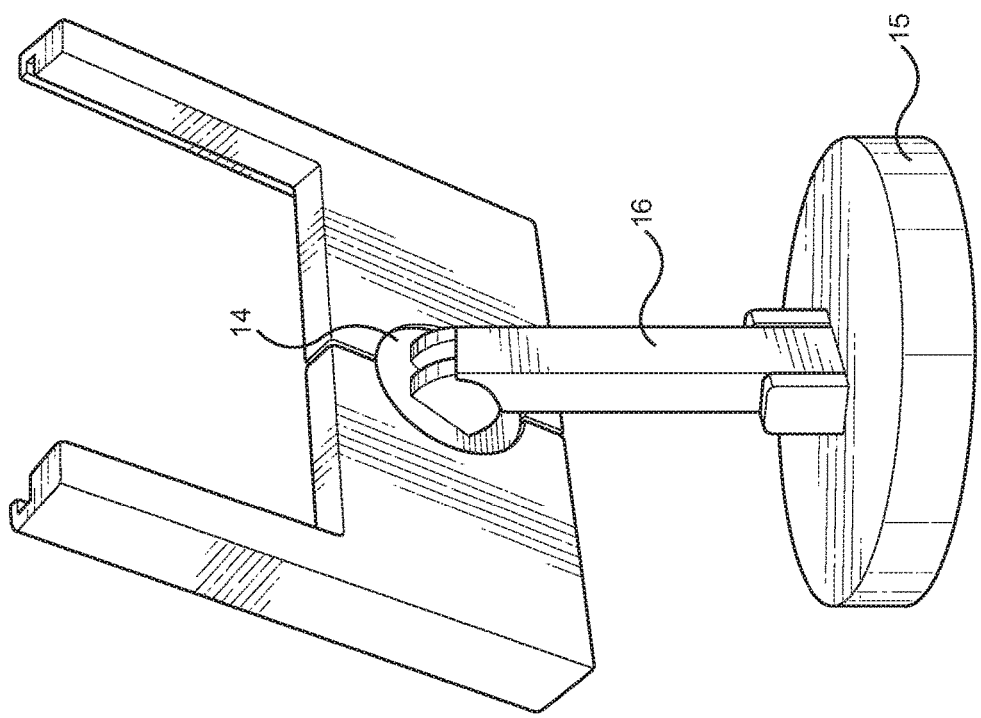
FIG. 3 shows a rear perspective view of an embodiment of the adjustable electronic device holder.

Referring now to FIG. 3, there is shown a rear perspective view of an embodiment of the adjustable electronic device holder. In the illustrated embodiment, the elongated arm 16 is hingedly attached to both the rigid planar base 15 and the center plate 14, wherein each hinged connection has approximately 180 degrees of movement. However, in other embodiments, the hinged connection allows for various amounts of rotation thereabout. In an alternative embodiment, the hinged connection with the center plate 14 also rotates in a 360-degree fashion about the elongated arm 16.

Figure 4:
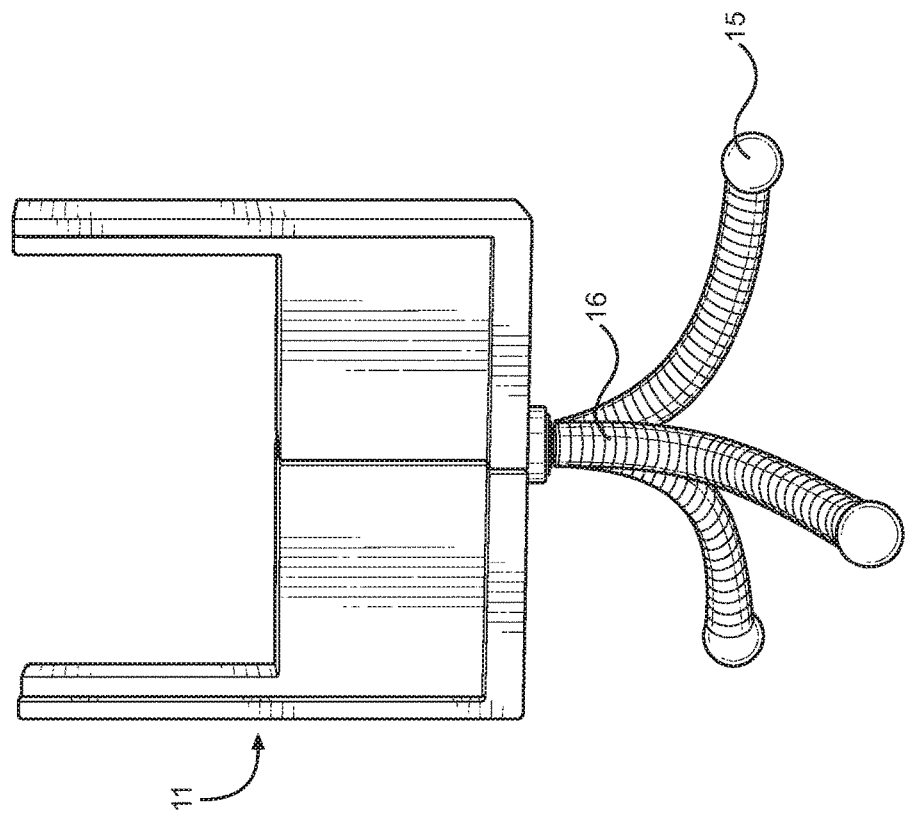
FIG. 4 shows a perspective view of an alternative embodiment of the adjustable electronic device holder.

Referring now to FIG. 4, there is shown a perspective view of an alternative embodiment of the adjustable electronic device holder. In the shown alternate embodiment of the adjustable electronic device holder 11, the elongated arm 16 comprises three arms attached to the center plate 14. A base 15 is disposed at a distal end of each of the elongated arms 16. The elongated arms 16 being attached together at one end and pivotally connected 25 to the center plate 14. The elongated arms 16 are independently movable and made of a flexible construction wherein they may be manipulated to form a stand of varying height and position.

Figure 5B:
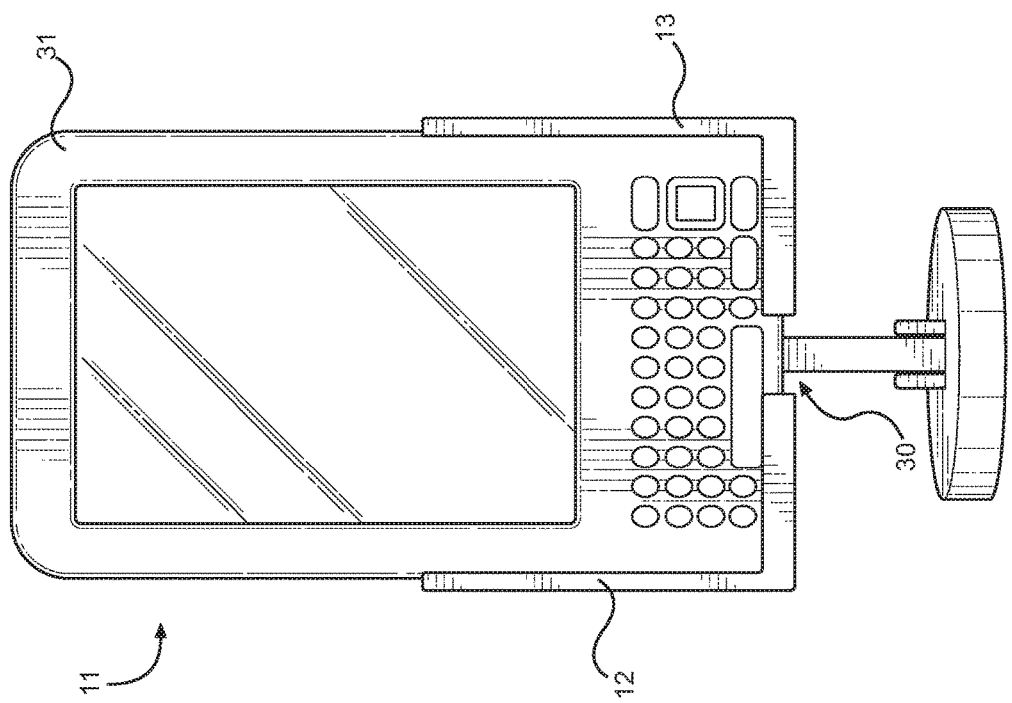
FIG. 5B shows a front view of an embodiment of the present invention securing electronic device of a second size in the brackets.
Figure 5A:
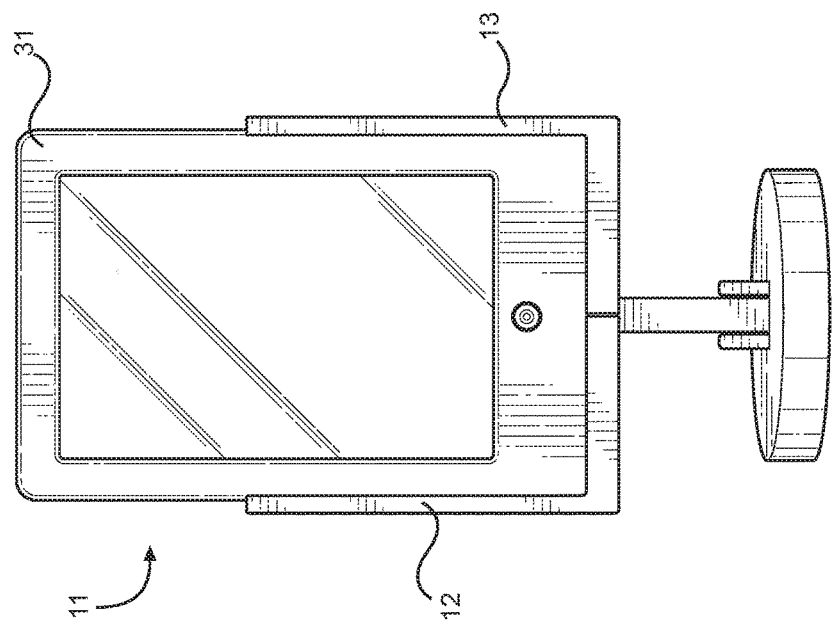
FIG. 5A shows a front view of an embodiment of the present invention securing an electronic device of a first size in the brackets.

Referring now to FIGS. 5A and 5B, there is shown a front view of an embodiment of the present invention securing an electronic device of a first and second size in the brackets, respectively. In use, the brackets 12, 13 selectively move lateral relative to the center plate to form an interior volume adapted to receive an electronic device. In the shown embodiments, the brackets 12, 13 extend equal distances from a center point of the adjustable electronic device holder 11. For example, the brackets 12, 13 may be operably connected to each other via a gear with opposing engaging tracks that provide for equal and linked movement. Additionally, a gap 30 between the brackets 12, 13 may be formed to receive an electrical connector for charging the received electronic device 31. However, in alternative embodiments, the brackets 12, 13 may slide independently from each other and at different distances from the center point. In this way, symmetrical or asymmetrical electronic devices 31 are receivable within the adjustable electronic device holder 11.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An adjustable electronic device holder, comprising:
   a housing having a first bracket and a second bracket slidably engaged with a center plate, the first bracket and the second bracket each having a front wall, wherein the first bracket is disposed on an opposing side of the center plate than the second bracket;
   the first bracket and the second bracket configured for selective lateral movement relative to the center plate;
   each bracket comprising a flange protruding from a perimeter thereof, the flange configured to engage with an electronic device received within the housing;
   the flange including a vertical section and a horizontal section, forming a L-shaped configuration;
   wherein the flange defines a channel between the front wall and the vertical section;
   wherein the front wall of each bracket extends a greater linear distance than the vertical section of the flange;
   wherein a width of the channel is entirely uniform;
   wherein the horizontal section of each flange extends towards a center region of the center plate;
   the center plate hingedly connected to a first end of an arm;
   a second end of the arm hingedly connected to a base;
   wherein slidable engagement of the first bracket and the second bracket defines a gap between the first bracket and the second bracket entirely through to a lowermost end of the housing configured to correspond to a charging port of an electronic device;
   wherein a recess is defined on a rear wall of the first bracket and the second bracket wherein the recess accomodates attachment of the arm to the center plate.

2. The adjustable electronic device holder of claim 1, wherein the arm is pivotally connected to a base configured to support the housing in an upright position.

3. The adjustable electronic device holder of claim 2, wherein the base comprises a rigid planar member configured for placement on a planar surface.

4. An adjustable electronic device holder, comprising:
   a housing having a first bracket and a second bracket slidably engaged with a center plate, the first bracket and the second bracket disposed on opposing sides of the center plate;

the first bracket and the second bracket configured for selective lateral movement relative to the center plate;

each bracket comprising a flange protruding from a perimeter thereof, the flange configured to engage with an electronic device received within the housing;

the flange including a vertical section and a horizontal section, forming a L-shaped configuration;

wherein the horizontal section of each flange extends towards a center region of the center plate;

the center plate connected to a plurality of legs wherein each leg extends from a central point thereon;

wherein slidable engagement of the first bracket and the second bracket defines a gap between the first bracket and the second bracket entirely through to a lowermost end of the housing configured to correspond to a charging port of an electronic device;

wherein a recess is defined on a rear wall of the first bracket and the second bracket wherein the recess accomodates attachment of the arm to the center plate.

5. The adjustable electronic device holder of claim 4, wherein each leg of the plurality of legs is independently movable.

6. The adjustable electronic device holder of claim 4, wherein each leg of the plurality of legs is of a flexible construction.

7. The adjustable electronic device holder of claim 1, wherein a friction-inducing material is disposed on a lower surface of the base.

8. The adjustable electronic device holder of claim 1, wherein the center plate extends upward and provides support to the electronic device.

* * * * *